(12) United States Patent
Huang

(10) Patent No.: US 12,185,830 B2
(45) Date of Patent: Jan. 7, 2025

(54) COMPUTER MONITOR STAND HAVING AUXILIARY DEVICES

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 205 days.

(21) Appl. No.: 18/093,858

(22) Filed: Jan. 6, 2023

(65) Prior Publication Data
US 2024/0225268 A1 Jul. 11, 2024

(51) Int. Cl.
| | |
|---|---|
| A47B 23/06 | (2006.01) |
| A47B 21/03 | (2006.01) |
| A47B 23/04 | (2006.01) |
| G06F 1/16 | (2006.01) |
| H04M 1/04 | (2006.01) |

(52) U.S. Cl.
CPC ............ *A47B 23/06* (2013.01); *A47B 21/03* (2013.01); *A47B 23/04* (2013.01); *G06F 1/1607* (2013.01); *H04M 1/04* (2013.01); *A47B 2023/049* (2013.01)

(58) Field of Classification Search
CPC ... A47B 23/04; A47B 2023/044; A47B 21/03; A47B 21/0314; G06F 1/1607
See application file for complete search history.

(56) References Cited

U.S. PATENT DOCUMENTS

| | | | | |
|---|---|---|---|---|
| 5,906,348 A * | 5/1999 | Orenstein | ............ | G06F 1/1607 248/311.2 |
| 6,234,085 B1 * | 5/2001 | Ramundo | ............ | A47B 23/002 108/143 |
| 7,150,236 B1 * | 12/2006 | Riley | ...................... | A47B 23/04 108/43 |
| 8,322,290 B1 * | 12/2012 | Mignano | ............... | A47B 23/043 248/456 |
| 8,424,464 B2 * | 4/2013 | Korpi | .................... | A47B 23/044 108/42 |
| 10,285,495 B1 * | 5/2019 | Valme | .................. | A47B 13/081 |
| 11,143,355 B1 * | 10/2021 | Huang | .................... | F16M 11/10 |
| 2008/0054149 A1 * | 3/2008 | Freebairn | ............ | F16M 11/2092 248/346.02 |
| 2009/0002932 A1 * | 1/2009 | Lord | ...................... | G06F 3/0395 361/679.56 |
| 2010/0300334 A1 * | 12/2010 | Tcholakov | ................ | A47B 3/08 108/127 |
| 2013/0061781 A1 * | 3/2013 | Wong | ....................... | A47B 23/04 108/3 |
| 2015/0021284 A1 * | 1/2015 | Ashley | .................... | A47B 23/04 403/345 |
| 2015/0192244 A1 * | 7/2015 | Haarburger | ............ | F16M 13/00 248/459 |
| 2016/0007734 A1 * | 1/2016 | Suman | ................... | A47B 23/043 108/26 |
| 2021/0059402 A1 * | 3/2021 | Huang | ................ | F16M 11/2021 |
| 2021/0062965 A1 * | 3/2021 | Huang | .................. | F16M 11/048 |
| 2021/0085073 A1 * | 3/2021 | Kang | ..................... | A47B 96/02 |

FOREIGN PATENT DOCUMENTS

GB 2271504 A * 4/1994 ............. A47B 23/04

* cited by examiner

*Primary Examiner* — Daniel J Rohrhoff
(74) *Attorney, Agent, or Firm* — Demian K. Jackson; Jackson IPG PLLC

(57) ABSTRACT

A stand for a computer monitor includes two auxiliary devices at two sides respectively. One auxiliary device is configured to extend out from one side of the stand and unfold to serve as a cup holder. The other auxiliary device is configured to extend out from the other side of the stand and unfold to serve as a holder for a cellular phone and/or a tablet computer.

3 Claims, 3 Drawing Sheets

COMPUTER MONITOR STAND HAVING AUXILIARY DEVICES

FIELD OF THE INVENTION

The invention relates to stands and more particularly to a stand for a computer monitor, the stand having two auxiliary devices at two sides respectively in which one auxiliary device is configured to extend out from one side of the stand and unfold to serve as a cup holder and the other auxiliary device is configured to extend out from the other side of the stand and unfold to serve as a holder for a cellular phone and/or a tablet computer.

BACKGROUND OF THE INVENTION

Mobile electronic devices (e.g., tablet computers and smart phones) are used by people in daily lives. For watching video more comfortably, a stand is provided on a bottom of an electronic device as support.

A user may need to move the stand with the hands. When the user needs to place the electronic device on the table, the user may use one hand to hold the body of the electronic device, and the other hand to moves the stand in order to change position.

Further, the user may use a cup, cellular phone and/or tablet computer while using the stand. The user needs to neatly place above items on the stand. However, in often times these items are arranged in a mess. Thus, the need for improvement still exists.

U.S. Pat. No. 11,089,866 to Huang discloses a folding stand for electronic device. While the device enjoys its success in the market, continuing improvements in the exploitation of computer monitor stand are constantly being sought.

SUMMARY OF THE INVENTION

It is therefore one object of the invention to provide a stand, comprising a panel; two opposite legs under the panel; a first auxiliary device provided in a first slot at a first side of the panel and configured to pull out of the first slot to hold at least one of a cellular phone and a tablet computer; a second auxiliary device is provided in a second slot at a second side of the panel and configured to pull out of the second slot to hold a cup; and transverse and longitudinal rails provided on a bottom surface of the panel corresponding to the second slot wherein the longitudinal rail has an end joined an end of the transverse rail and communicating therewith; wherein the second auxiliary device includes a projection moveably disposed in the transverse rail or the longitudinal rail, a central opening for accommodating a cup, a base support member for supporting an underside of the cup, a first pivotal link having a first end pivotably secured to a bottom of the second auxiliary device and a second end pivotably secured to a first side of the base support member, and a second pivotal link having a first end pivotably secured to the bottom of the second auxiliary device and a second end pivotably secured to a second side of the base support member; wherein the first pivotal link and the second pivotal link are configured to pivot upward; and wherein the first auxiliary device includes a planar support member, a base frame having a first end pivotably secured to a bottom of a rear surface of the planar support member, a back support member having a first end pivotably secured to an intermediate portion of the rear surface of the planar support member and a second end pivotably secured to an intermediate portion of a top surface of the base frame, and two folding boards pivotably secured to a front surface of the planar support member.

The invention has the following advantages and benefits in comparison with the conventional art: in addition to allowing a computer monitor to be placed on the panel, the stand has two auxiliary devices at two sides respectively in which one auxiliary device is configured to extend out from one side of the panel and unfold to serve as a cup holder and the other auxiliary device is configured to extend out from the other side of the panel and unfold to serve as a holder for a cellular phone and/or a tablet computer, thereby saving space and achieving the purpose of expansion.

The above and other objects, features and advantages of the invention will become apparent from the following detailed description taken with the accompanying drawings

DETAILED DESCRIPTION OF THE INVENTION

Figure 1:
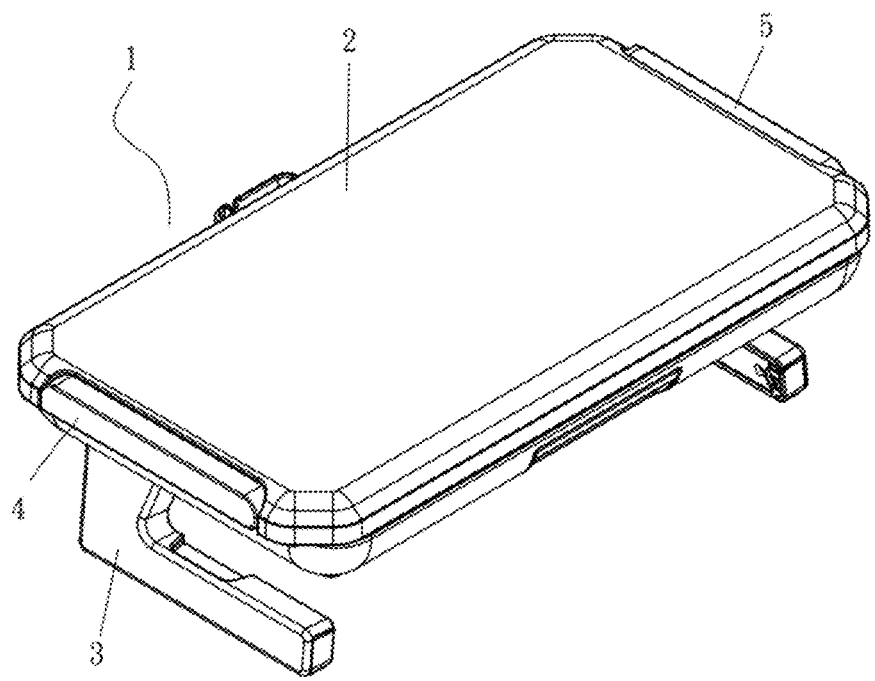
FIG. 1 is a perspective view of a computer monitor stand of the invention.
Figure 2:
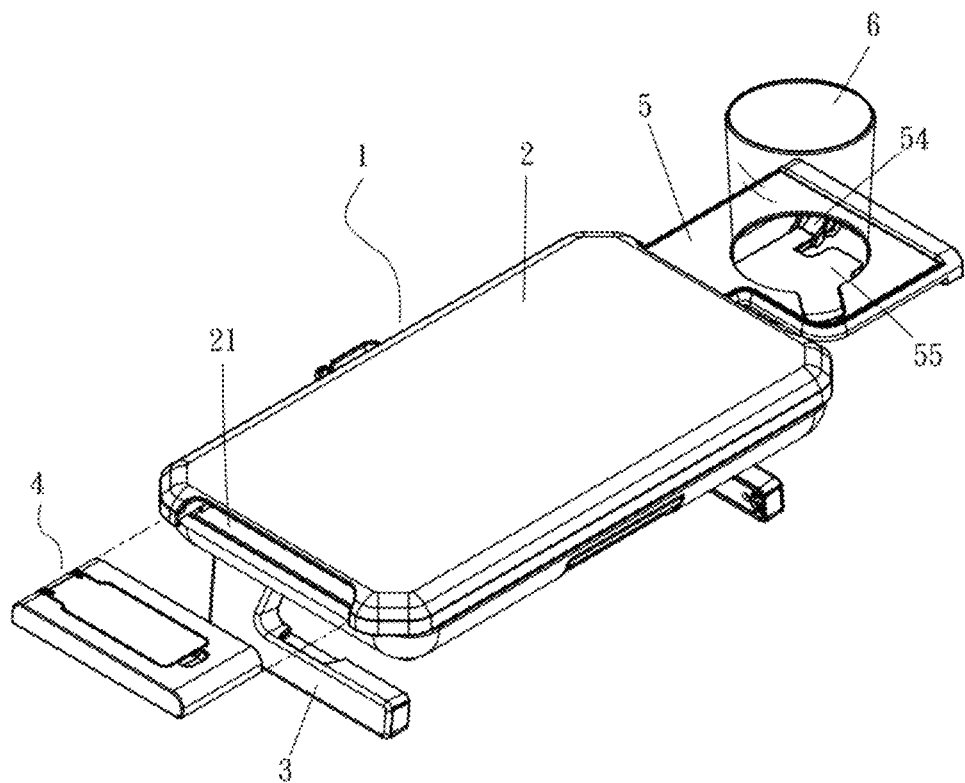
FIG. 2 is a perspective view of the computer monitor stand in which two auxiliary devices have been pulled out from two sides of the computer monitor stand respectively, and a cup is held by the auxiliary device on the right side.
Figure 3:
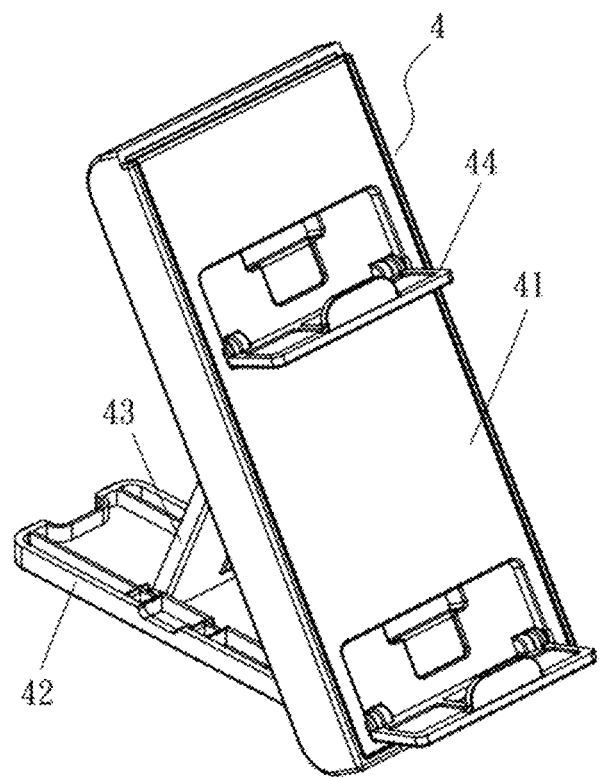
FIG. 3 is a perspective view of the pulled out auxiliary device on the left side, the pulled out auxiliary device being further fully unfolded in a ready to use position.
Figure 4:
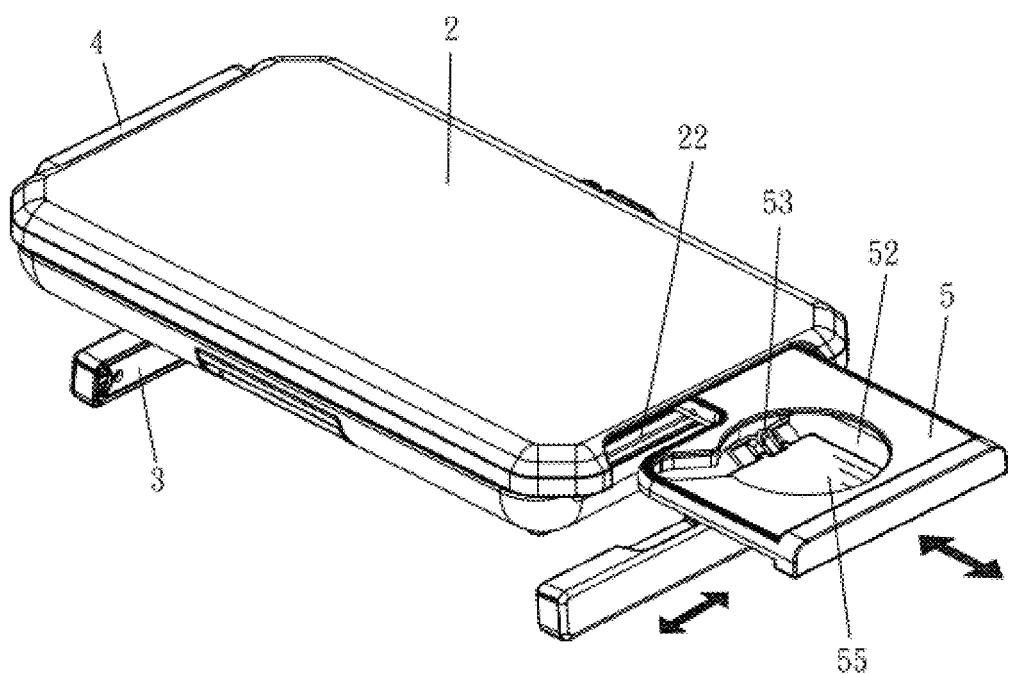
FIG. 4 is a perspective view of the computer monitor stand in which the right side auxiliary device has been pulled out in a ready to use position.
Figure 5:
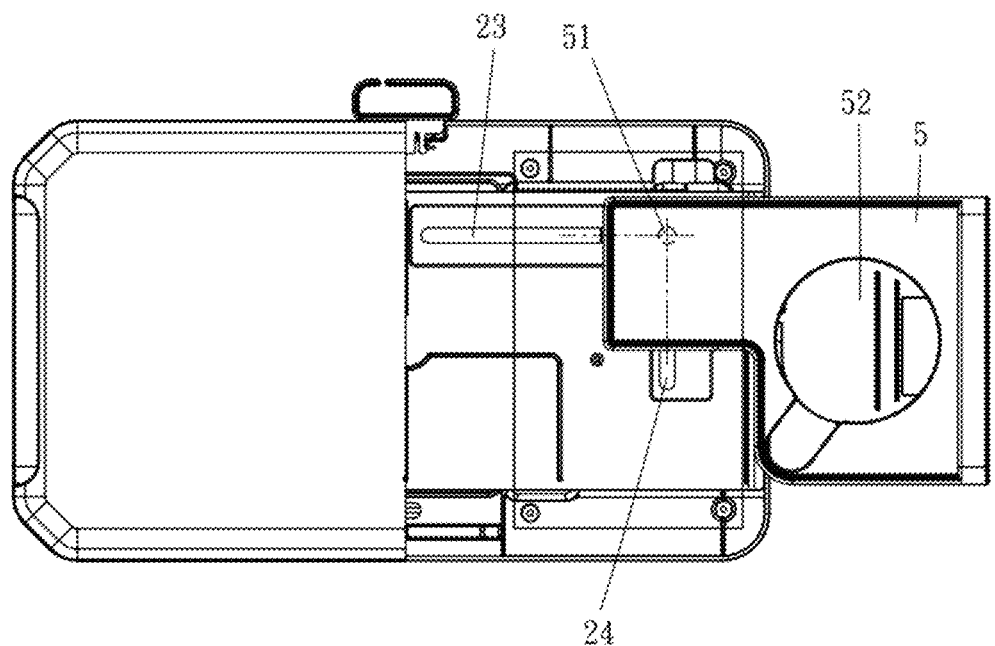
FIG. 5 is a fragmentary bottom plan view of the computer monitor stand of FIG. 4.
Figure 6:
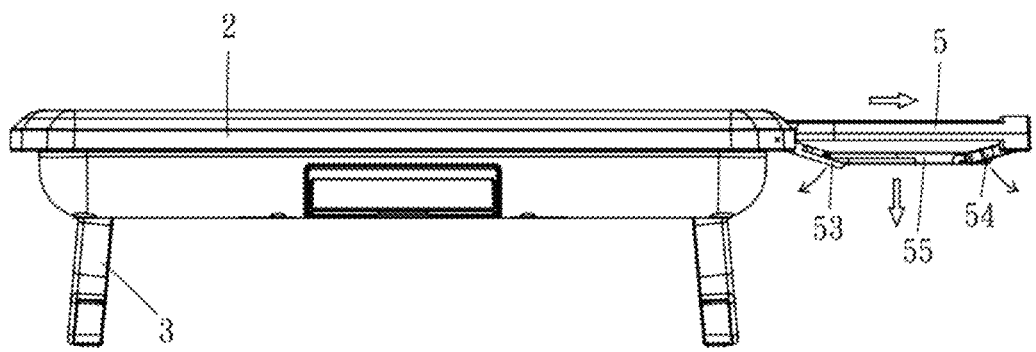
FIG. 6 is a front view of the computer monitor stand of FIG. 4 showing a first step of unfolding the pulled out auxiliary device on the right side.
Figure 7:
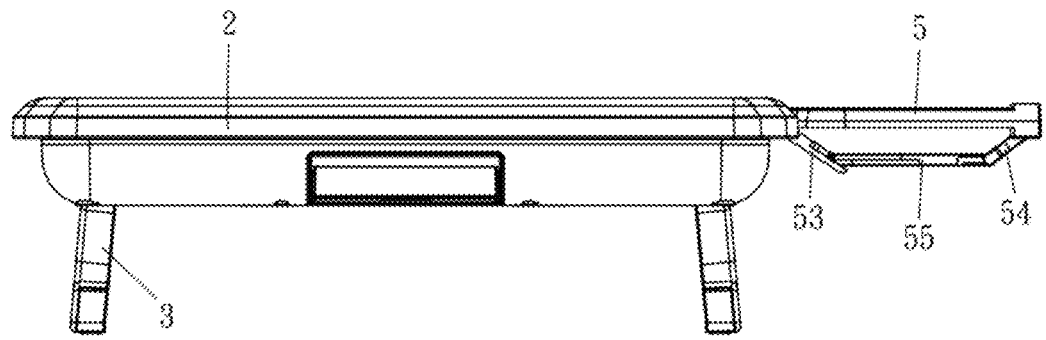
FIG. 7 is a front view of the computer monitor stand of FIG. 4 showing a final step of unfolding the pulled out auxiliary device on the right side.

Referring to FIGS. 1 to 7, a computer monitor stand 1 in accordance with the invention comprises a panel 2 and two opposite legs 3 under the panel 2 as discussed in detail below.

A first auxiliary device 4 is provided at a first side of the panel 2 and a second auxiliary device 5 is provided at a second side of the panel 2 respectively. The first auxiliary device 4 is configured to extend out and unfold to serve as a holder for a cellular phone and/or a tablet computer and the second auxiliary device 5 is configured to extend out and unfold to serve as a cup holder.

A first slot 21 is provided on the first side of the panel 2 and the first auxiliary device 4 is configured to receive in the first slot 21 after has been folded. The first auxiliary device 4 includes a planar support member 41, a base frame 42 having a first end pivotably secured to a bottom of a rear surface of the planar support member 41, a back support member 43 having a first end pivotably secured to an intermediate portion of the rear surface of the planar support member 41 and a second end pivotably secured to an intermediate portion of a top surface of the base frame 42, and two folding boards 44 pivotably secured to a front surface of the planar support member 41. For example, after the folding boards 44 have been fully unfolded, a cellular phone can be placed on the upper one of the unfolded folding board 44 and a tablet computer can be placed on the lower one of the unfolded folding board 44.

A second slot 22 is provided on the second side of the panel 2 and the second auxiliary device 5 is configured to receive in the second slot 22 after has been folded. A transverse rail 23 and a longitudinal rail 24 having an end joined an end of the transverse rail 23 both are provided on a bottom surface of the panel 2 corresponding to the second slot 22. The second auxiliary device 5 includes a projection 51 moveably disposed in the transverse rail 23 or the longitudinal rail 24. Thus the second auxiliary device 5 is configured to pull out along the transverse rail 23 and after the projection 51 has reached the joining point of the transverse rail 23 and the longitudinal rail 24, the second auxiliary device 5 is configured to further pull forward along the longitudinal rail 24 (see FIG. 4). To the contrary, the second auxiliary device 5 is configured to push rearward along the longitudinal rail 24 until being stopped and further the second auxiliary device 5 is configured to push in along the transverse rail 23 until being stopped, i.e., being received in the second slot 22.

The second auxiliary device 5 further comprises a central opening 52 for allowing a cup 6 to partially pass through, a base support member 55 for supporting an underside of the positioned cup 6, a first pivotal link 53 having a first end pivotably secured to a bottom of the second auxiliary device 5 and a second end pivotably secured to a first side of the base support member 55, and a second pivotal link 54 having a first end pivotably secured to the bottom of the second auxiliary device 5 and a second end pivotably secured to a second side of the base support member 55. The first pivotal link 53 and the second pivotal link 54 can be pivoted to upward until being stopped so that the second auxiliary device 5 can be further pushed into the second slot 22 to be received.

In another embodiment of the invention, only the first auxiliary device 4 is provided. In still another embodiment of the invention, only the second auxiliary device 5 is provided.

The invention has the following advantages and benefits in comparison with the conventional art: in addition to allowing a computer monitor to be placed on the panel, the stand has two auxiliary devices at two sides respectively in which one auxiliary device is configured to extend out from one side of the panel and unfold to serve as a cup holder and the other auxiliary device is configured to extend out from the other side of the panel and unfold to serve as a holder for a cellular phone and/or a tablet computer, thereby saving space and achieving the purpose of expansion.

While the invention has been described in terms of preferred embodiments, those skilled in the art will recognize that the invention can be practiced with modifications within the spirit and scope of the appended claims.

What is claimed is:

1. A stand, comprising:
a panel;
two opposite legs under the panel;
a first auxiliary device provided in a first slot at a first side of the panel and configured to pull out of the first slot to hold at least one of a cellular phone and a tablet computer;
a second auxiliary device is provided in a second slot at a second side of the panel and configured to pull out of the second slot to hold a cup; and
transverse and longitudinal rails provided on a bottom surface of the panel corresponding to the second slot wherein the longitudinal rail has an end joined an end of the transverse rail and communicating therewith;
wherein the second auxiliary device includes a projection moveably disposed in the transverse rail or the longitudinal rail, a central opening for accommodating a cup, a base support member for supporting an underside of the cup, a first pivotal link having a first end pivotably secured to a bottom of the second auxiliary device and a second end pivotably secured to a first side of the base support member, and a second pivotal link having a first end pivotably secured to the bottom of the second auxiliary device and a second end pivotably secured to a second side of the base support member;
wherein the first pivotal link and the second pivotal link are configured to pivot upward; and
wherein the first auxiliary device includes a planar support member, a base frame having a first end pivotably secured to a bottom of a rear surface of the planar support member, a back support member having a first end pivotably secured to an intermediate portion of the rear surface of the planar support member and a second end pivotably secured to an intermediate portion of a top surface of the base frame, and two folding boards pivotably secured to a front surface of the planar support member.

2. A stand, comprising:
a panel;
two opposite legs under the panel; and
a first auxiliary device provided in a first slot at a first side of the panel and configured to pull out of the first slot to hold at least one of a cellular phone and a tablet computer;
wherein the first auxiliary device includes a planar support member, a base frame having a first end pivotably secured to a bottom of a rear surface of the planar support member, a back support member having a first end pivotably secured to an intermediate portion of the rear surface of the planar support member and a second end pivotably secured to an intermediate portion of a top surface of the base frame, and two folding boards pivotably secured to a front surface of the planar support member.

3. A stand, comprising:
a panel;
two opposite legs under the panel;
a second auxiliary device is provided in a second slot at a second side of the panel and configured to pull out of the second slot to hold a cup; and
transverse and longitudinal rails provided on a bottom surface of the panel corresponding to the second slot wherein the longitudinal rail has an end joined an end of the transverse rail and communicating therewith;
wherein the second auxiliary device includes a projection moveably disposed in the transverse rail or the longitudinal rail, a central opening for accommodating a cup, a base support member for supporting an underside of the cup, a first pivotal link having a first end pivotably secured to a bottom of the second auxiliary device and a second end pivotably secured to a first side of the base support member, and a second pivotal link having a first end pivotably secured to the bottom of the second auxiliary device and a second end pivotably secured to a second side of the base support member, and wherein the first pivotal link and the second pivotal link are configured to pivot upward.

* * * * *